United States Patent
Godfrey (10) Patent No.: US 9,250,112 B2
(45) Date of Patent: Feb. 2, 2016

(54) TECHNIQUES FOR DISTRIBUTED ACOUSTIC SENSING

(75) Inventor: Alastair Godfrey, Malvern (GB)

(73) Assignee: OPTASENSE HOLDINGS LIMITED (GB)

( * ) Notice: Subject to any disclaimer, the term of this patent is extended or adjusted under 35 U.S.C. 154(b) by 242 days.

(21) Appl. No.: 13/981,310

(22) PCT Filed: Feb. 21, 2012

(86) PCT No.: PCT/GB2012/000178
§ 371 (c)(1),
(2), (4) Date: Jul. 23, 2013

(87) PCT Pub. No.: WO2012/114067
PCT Pub. Date: Aug. 30, 2012

(65) Prior Publication Data
US 2013/0298635 A1    Nov. 14, 2013

(30) Foreign Application Priority Data

Feb. 21, 2011    (GB) .................................. 1102930.3

(51) Int. Cl.
*G02B 6/00* (2006.01)
*G01F 25/00* (2006.01)
*G01F 1/66* (2006.01)
*G01H 9/00* (2006.01)

(52) U.S. Cl.
CPC .............. *G01F 25/0007* (2013.01); *G01F 1/66* (2013.01); *G01F 1/661* (2013.01); *G01F 1/667* (2013.01); *G01H 9/004* (2013.01)

(58) Field of Classification Search
None
See application file for complete search history.

(56) References Cited

U.S. PATENT DOCUMENTS

| | | | |
|---|---|---|---|
| 4,333,353 A | 6/1982 | Baumoel | |
| 6,874,361 B1 | 4/2005 | Meltz et al. | |
| 2002/0063866 A1 | 5/2002 | Kersey et al. | |
| 2010/0107754 A1 | 5/2010 | Hartog et al. | |
| 2010/0207019 A1 | 8/2010 | Hartog et al. | |
| 2012/0152024 A1* | 6/2012 | Johansen | 73/655 |
| 2013/0104642 A1* | 5/2013 | Pelletier et al. | 73/152.47 |
| 2013/0333474 A1* | 12/2013 | Godfrey et al. | 73/592 |

(Continued)

FOREIGN PATENT DOCUMENTS

| | | |
|---|---|---|
| GB | 2438533 | 11/2007 |
| GB | 2442745 | 4/2008 |

(Continued)

*Primary Examiner* — Sung Pak
(74) *Attorney, Agent, or Firm* — McDonnell Boehnen Hulbert & Berghoff LLP (57) ABSTRACT

The application describes techniques for monitoring the rate of flow of fluid in a conduit (205) using fiber optic distributed acoustic sensing which are especially applicable to flow in oil and gas wells. The techniques also allow for calibration of the position of the channels of a fiber optic distributed acoustic sensor arranged along a fluid carrying conduit. The techniques comprise introducing a first acoustic stimulus (303) travelling in one direction and a second acoustic stimulus (304) travelling in the opposite direction. Flow of the fluid (v) results in a difference in the propagation velocity of the two acoustic stimuli. The first and second acoustic stimuli create a standing wave and the beat effect due to the flow induced wavelength variation is detected and used to determine flow rate. The acoustic stimulus may be introduced to travel through the conduit to provide the first stimulus and to reflect from the end of the conduit and travel back as the second acoustic stimulus.

21 Claims, 2 Drawing Sheets

(56) References Cited

U.S. PATENT DOCUMENTS

2014/0150523 A1* 6/2014 Stokely et al. ............... 73/1.82
2014/0219056 A1* 8/2014 Samson et al. ............... 367/81
2015/0021015 A1* 1/2015 Xiao ....................... 166/250.01
2015/0075292 A1* 3/2015 Lee ........................ 73/861.28

FOREIGN PATENT DOCUMENTS

| WO | WO 2005/116601 | 12/2005 |
| WO | WO 2010/116119 | 10/2010 |

* cited by examiner

TECHNIQUES FOR DISTRIBUTED ACOUSTIC SENSING

FIELD OF THE INVENTION

This invention relates to methods and apparatus for fibre optic distributed acoustic sensing, in particular to techniques for flow measurement using distributed acoustic sensing and calibration of fibre optic distributed acoustic sensors, for example in downhole environments.

BACKGROUND OF THE INVENTION

In the oil and gas industry there is sometimes a desire to determine the flow rates of oil and gas through a production well at different parts of the well. The rate of flow of product at the top of the well can be determined relatively easily, for example by using a suitable flow meter. However the rate of flow at different depths into the well may be of interest. For example the rate of flow at different depths within the well may indicate the relative contribution to the total flow of the various different sections of the well which provide an inlet for the oil or gas. This may be useful for long term monitoring and/or to provide useful information for planning future wells. Also in some instances a well may be divided into a number of different production zones which are effectively owned or leased by different organisations. Thus there may be a need to determine the relative contribution to the total flow from each production zone.

The use of permanent flow meters at different depths within a well is not generally practical due to the difficulties in providing suitably rugged equipment that can survive the harsh conditions in a production well for long periods of time, and the difficulties in installing such equipment with a suitable power supply and means of relaying the flow information to the surface. Typically therefore flow readings are acquired periodically by inserting wire line tools having one or more flow meters into the well on a temporary basis and taking flow readings at different depths. However the use of wire line tools involves halting normal production and is a relatively expensive procedure.

It would therefore be desirable to be able to monitor production flow at different depths within a well in use without the need for inserting any special instruments into the flow.

SUMMARY OF THE INVENTION

Thus according to the present invention there is provided a method of determining flow speed of a fluid within a conduit comprising the steps of: introducing at least one acoustic stimulus into the fluid in the conduit such that a first acoustic stimulus travels in one direction in the conduit and a second acoustic stimulus travels in the opposite direction in the conduit so as to set up standing waves within the fluid, interrogating an optical fibre deployed along the length of the conduit to provide a fibre optic distributed acoustic sensor, monitoring the acoustic response to the first acoustic stimulus and second acoustic stimulus using said distributed acoustic sensor and using said acoustic response to determine the flow speed of the fluid.

The conduit may be the production tubing of an oil or gas well, although the general principles are applicable to measuring flow along any type of conduit.

The present invention uses a fibre optic distributed acoustic sensor to monitor acoustic stimuli introduced into the fluid in the conduit so as to determine flow rate. Fibre optic distributed acoustic sensing (DAS) is a known technique whereby a single length of optical fibre is optically interrogated, usually by one or more input pulses, to provide substantially continuous sensing of acoustic activity along its length. Optical pulses are launched into the fibre and the radiation backscattered from within the fibre is detected and analysed. By analysing the radiation Rayleigh backscattered within the fibre, the fibre can effectively be divided into a plurality of discrete sensing portions which may be (but do not have to be) contiguous. Within each discrete sensing portion mechanical vibrations of the fibre, for instance from acoustic sources, cause a variation in the properties of the radiation which is backscattered from that portion. This variation can be detected and analysed and used to give a measure of the intensity of disturbance of the fibre at that sensing portion. As used in this specification the term "distributed acoustic sensor" will be taken to mean a sensor comprising an optic fibre which is interrogated optically to provide a plurality of discrete acoustic sensing portions distributed longitudinally along the fibre and acoustic shall be taken to mean any type of mechanical vibration or pressure wave, including seismic waves.

In the method of the present invention an optical fibre deployed along the length of the conduit is used as the sensing fibre and thus the acoustic signals acting on a plurality of different sensing portions of optical fibre, corresponding to a plurality of different positions along the conduit, can be monitored.

The method involves introducing an acoustic stimulus such that a first acoustic stimulus travels in one direction along the conduit and a second acoustic stimulus travels in the opposite direction. In applications such as well monitoring where the conduit has an end the method may comprise introducing the stimulus such that the stimulus travels down the conduit to provide the first acoustic stimulus and reflects from the end of the conduit and travels back along the conduit to provide the second acoustic stimulus. Thus the acoustic stimulus should be sufficiently intense to be able to propagate to the end of the conduit and back.

Where there is flow of the fluid within the conduit one of the first and second acoustic stimuli will travel in the same direction as the fluid flow and the other will travel against the fluid flow. For instance in an oil or gas well where the fluid is flowing towards the surface the first stimulus may propagate into the well against the fluid flow and the second stimulus may propagate back up the well in the same direction as the fluid flow. The propagation speed of the first and second acoustic stimuli will therefore vary. The acoustic stimulus travelling in the same direction as the fluid flow will propagate at a speed equal to $c+v$, relative to the stationary fibre, where $c$ is the speed of sound in the fluid and $v$ is the flow velocity. The acoustic stimulus travelling in the opposite direction, against the flow, will propagate at a speed equal to $c-v$. This difference in speed of the first and second acoustic stimuli will lead to an acoustic response which can be detected and used to determine the flow speed at different sections of the conduit.

The method involves setting up standing waves within the fluid and thus may comprise introducing a continual stimulus into the fluid. By continual is meant that that the stimulus is continuous during a measurement period. Thus the first acoustic stimulus may be a propagating wave in the first direction and the second acoustic stimulus a propagating wave in the second direction. Again the second acoustic stimulus may be generated by a reflection of the first acoustic stimulus from the end of the conduit. In this case the two waves will be at the same frequency and there will be a phase change imposed between the first and second stimulus waves depending on the acoustic impedance change between the fluid and the end of the conduit. However in other applications there may be two transducers at different locations on the conduit for producing waves travelling in opposite directions.

In the absence of any fluid flow the standing wave will be understood as the sum of the waves of the first and second acoustic stimuli. In the presence of fluid flow however the change in propagation speed of the wave travelling with the fluid flow compared to that travelling in the direction opposite to the fluid flow will lead to a change in the wavelengths of the respective waves. In the flow case therefore there is a beat effect due to the interference of the travelling waves of different wavelength. The beat distance, i.e. the separation between nodes (or antinodes) of the standing wave will depend upon the frequency of the stimulus waves and also on the speed of sound and the flow speed. Thus by detecting the sensing portions of the distributed acoustic sensor which correspond to nodes and/or antinodes of the standing wave the beat distance of the standing wave can be determined. Knowing the beat distance and the frequency of the stimulus waves the speed of sound in the fluid and the flow speed can be calculated. The method may therefore comprise detecting sensing portions of the optical fibre which correspond to nodes and/or antinodes of a standing wave. The method may comprise determining the distance along the conduit between said sensing portions of optical fibre and using said distance to determine the flow speed at that section of conduit.

The frequency of the stimulus waves should be chosen such that, for the flow speeds expected, the beat distance is at least twice the length of an individual sensing portion of the optical fibre in order to allow the peaks to be resolved. However the beat distance should be no greater than the required resolution of the flow velocity, for instance 100 m as discussed above.

If the frequency of the stimulus wave is set to be of the order of 10 kHz and the beat distance is 100 m this gives a minimum detectable flow speed of 0.125 $ms^{-1}$ for a speed of sound of 500 $ms^{-1}$.

It is noted however that in the method of this embodiment of the invention it is the beat effect that is detected. The spatial resolution and/or velocity resolution may therefore be improved by using travelling waves of high frequency, for instance the first and second acoustic stimulus may have frequencies in the ultrasonic range, for instance higher than about 20 kHz. Depending on the distributed acoustic sensor used the frequency of the first or second acoustic stimuli may or may not be directly detectable. However the beat effect produced in the presence of flow will be detectable, and can provide the same flow speed resolution over a shorter section of conduit and/or can provide greater flow speed resolution for a given distance. For the avoidance of doubt therefore the reference to an acoustic stimulus refers to a pressure wave of any suitable frequency and includes ultrasonic frequencies.

The embodiments described above rely on knowledge of the distance between the sections of conduit that correspond to the relevant discrete sensing portions, i.e. the first and second sensing portions used to time the propagation of acoustic pulses or the sensing sections corresponding to nodes and/or antinodes of a standing wave. In some applications this spacing may be directly determined through knowledge of the deployment of the optical fibre along the length of the conduit. The locations of the relevant sensing portions within the optical fibre are defined by the processing of the distributed acoustic sensor and thus the distance into the optical fibre of the sensing portions can be controlled. Thus knowledge of the deployment of optical fibre relative to the conduit may be used to determine which section of fibre corresponds to which section of conduit. For example if the optical fibre is arranged to run from the start to the end of the conduit and to exactly follow the path of the conduit then, taking into account any length of fibre between the interrogator unit and the start of the conduit, the distance into the fibre corresponds to distance along the conduit. It should be noted that in some situations the absolute position of the sensing portions relative to the conduit may not be known exactly but the distance along the conduit between the relevant two sections may be known reasonably accurately and this will be sufficient in order to determine the flow speed of the fluid. For the first embodiment all that is needed is the time for the first and second stimuli to travel between two points and the distance between those two points. The absolute position of those points need not be known exactly, although clearly to be able to associate the flow speed determined with the relevant section of the conduit the rough location of the first and second sensing portions along the conduit should be known. For the second embodiment likewise it is the distance between the sensing portions corresponding to the nodes and/or antinodes that is important and again not necessarily their absolute position.

In some applications however the exact deployment of the optical fibre along the length of the conduit may not be known. For example it is typical in the manufacture of fibre optic cables to provide a certain degree of overstuffing of the optical fibre within the cable. This will allow a certain degree of stretching of the cable without damage to the optical fibre contained within. The exact degree of overstuff may not be known exactly and thus even if the deployment of the cable is known it may not be known exactly how much optical fibre is contained in a certain length of cable. In application to downhole monitoring this may be exacerbated by the cable being stretched during deployment by a variable amount at different sections of the well. The optical fibre may be deployed in oil and gas wells during the well construction phase by attaching the optical fibre to the outside of a production casing. Typically in well formation a borehole is drilled and then sections of production casing forced down the borehole with separate sections being joined as they are inserted. Once the casing is in place along the length of the borehole the void between the outside of the casing and the borehole may be at least partly filled with cement. Various other production steps such as perforation and hydraulic fracturing may be undertaken before production tubing is located within the casing to carry the oil or gas to the surface. The optical fibre which is used for distributed acoustic sensing may be attached to the outside of the production casing as the casing is being forced down the well bore. The stresses involved in forcing the casing down the borehole may result in an unknown degree of stretching of the optical fibre. Thus in a downwell application although it is known that the cable is attached to the outside of the production casing and deployed along the length of the well the amount of stretching at any section of the well and hence the length of optical fibre that corresponds to a given length of well may not be known.

In some applications the locations of the conduit that correspond to various sensing portions of the distributed acoustic fibre may be determined by calibrating acoustic events at known locations in the conduit with the sensing portions of the distributed acoustic sensor which detect such acoustic events. Thus, for instance if a wire line tool is inserted a known distance into the well and it produces an acoustic signal that can be detected the sensing portion of optical fibre from which the acoustic signal is first detected may be determined to be the sensing portion that corresponds to that section of the well. Thus the relative positions of at least some sensing portions of optical fibre to the conduit may have been determine previously, for instance by monitoring acoustic events at known locations along the conduit.

However, in another embodiment the acoustic response to the first and second stimuli may be monitored and used, with knowledge of the speed of sound in the fluid of the conduit, to determine the distance between the first and second sensing portions. As noted above, a measurement of one distance related variable (i.e. the separation of nodes/antinodes of a standing wave) can be used, together with a time related variable (i.e. the frequency of the standing wave), to determine the flow rate of the fluid and the speed of sound in the fluid. Equally however if the speed of sound in the fluid is known for the relevant section of conduit then using the relevant time related variable, the distance between the sensing portions of fibre may be determined if previously unknown.

The speed of sound of the fluid may be estimated based on knowledge of the composition of the fluid and also on knowledge of the temperature of the fluid. Oil and gas wells often have temperature sensors, such as fibre optic distributed temperature sensors, deployed within the well to monitor the temperature gradient down the well. Based on the temperature gradient the speed of sound may be estimated for the general part of the well where the sensing portions will lie.

In another aspect therefore the present invention provides a method of calibrating a distributed acoustic sensor having an optical fibre deployed along the length of a fluid carrying conduit comprising: introducing at least one acoustic stimulus into the fluid in the conduit such that a first acoustic stimulus travels in one direction in the conduit and a second acoustic stimulus travels in the opposite direction in the conduit so as to set up a standing wave; and determining the sensing portions of the distributed acoustic sensor which correspond to the nodes and/or antinodes of the standing wave to calibrate said distributed acoustic sensor.

The method of calibration may be performed in the absence of any flow of the fluid. It will be appreciated that in the absence of any flow the first and second acoustic stimuli may have the same wavelength and thus there is no beat effect. In this instance the nodes and/or antinodes of the standing wave may be directly detected—rather than detecting the beats. As a result a much lower frequency can be used to give the same general spatial separation of the nodes/antinodes. For example a frequency of around 10 Hz or so may be suitable.

In some embodiments the relative position of the sensing portions of optical fibre within the well could be calibrated before flow starts. As mentioned above the optical fibre may be installed in a well along with the production casing. Once the production casing is inserted the fibre may be interrogated to provide a distributed acoustic sensor and thus various stages of well formation may be monitored. During some stages of well formation the production casing and/or production tubing may be filled with a fluid other than oil or gas, for instance water that is introduced into the well. The speed of sound in the well in a fluid of known composition such as water may be known or estimated more accurately than is possible during oil or gas flow in production. Thus the method may comprise performing calibration when a fluid of known composition, other than oil or gas, in present in the conduit. Clearly the properties of the acoustic stimulus will be appropriate to give the desired spatial separation of the nodes/antinodes in the appropriate fluid.

As mentioned above the aspects of the present invention are particularly applicable to oil and gas wells. In an oil or gas well the optical fibre may be deployed within the production tubing or may be deployed on the outside of the production tubing. In some applications however an optical fibre may be deployed on the outside of a production casing.

The step of interrogating the optical fibre to provide a distributed acoustic sensor may comprise launching a series of optical pulses into said fibre and detecting radiation Rayleigh backscattered by the fibre; and processing the detected Rayleigh backscattered radiation to provide a plurality of discrete longitudinal sensing portions of the fibre. Note that as used herein the term optical is not restricted to the visible spectrum and optical radiation includes infrared radiation and ultraviolet radiation.

A suitable distributed acoustic sensing system is described in GB2442745 for example, the content of which is hereby incorporated by reference. Such a sensor may be seen as a fully distributed or intrinsic sensor as it uses the intrinsic scattering processed inherent in an optical fibre and thus distributes the sensing function throughout the whole of the optical fibre. Since the fibre has no discontinuities, the length and arrangement of fibre sections corresponding to each channel is determined by the interrogation of the fibre. These can be selected according to the physical arrangement of the fibre and the well it is monitoring, and also according to the type of monitoring required. In a typical downhole application a fibre length of a few kilometers is usual, i.e. a fibre runs along the length of the entire borehole and the channel resolution of the longitudinal sensing portions of fibre may be of the order or 1 m or a few meters.

In the method of the present invention the returns from the fibre may be processed to provide an indication of flow speed from one or more distinct sections of a well. The processing from each separate acoustic channel can be done in real time. Thus the method of the present invention can provide an indication of flow at different sections of a well in real-time, i.e. without any significant delay. It should be noted that the method of the present invention may be applied to monitoring the flow of fluid out of the well, e.g. oil or gas flow in production. However the method may also be applied to monitoring the flow of fluid into the well. For instance, as mentioned above during well formation a hydraulic fracturing step may be performed. This involves forcing a fluid into the well under pressure so that the fluid flows into perforation sites and fractures the rock. Typically water containing a solid particulate such as sand, referred to as proppant, is flowed into the well. It would be desirable to know the volume of proppant which is flowing into each perforation site so as to be able to control the fracturing process. The method of the present invention may be used during flow of fluid/proppant into the well in a hydraulic fracturing step and the proppant flowing through a perforated section of well can be determined by monitoring the flow before and after the relevant section. It will be appreciated that flow of fluid containing proppant may be relatively noisy and so the acoustic stimulus introduced should be sufficient to allow detection of the acoustic response to the stimulus.

For oil and gas well the acoustic stimulus should be produced at the well head by an acoustic transducer which is safe in the presence of oil or gas, i.e. does not present an ignition source, and is able to produce a sufficient stimulus in the fluid to allow the acoustic response to be detected. A pneumatic or hydraulic transducer may be suitable. The method may therefore comprise generating the acoustic stimulus using a pneumatic or hydraulic transducer.

The acoustic stimulus may be generated continually. This may result in a continuous wave being transmitted into the fluid from the top of the well. Alternatively the method may be repeated periodically or as required.

The invention also relates to a distributed acoustic sensing apparatus capable of determining flow speed of a fluid in a conduit comprising an optical source for generating radiation to be launched into an optical fibre, a detector for detecting radiation backscattered from said optical fibre and a processor for processing said detected radiation to provide a distributed acoustic sensor wherein said processor is configured to process the acoustic signals to detect the acoustic response to a first acoustic stimulus travelling in one direction in the conduit and a second acoustic stimulus travelling in the other in the conduit so as to detect sensing portions of the optical fibre which correspond to beat nodes and/or antinodes of a standing wave and determine a flow speed in said conduit.

The invention also relates to a flow speed measuring apparatus comprising a distributed acoustic sensor as described above and an acoustic transducer for generating an acoustic stimulus in the fluid in a conduit. The acoustic transducer may be arranged to generate a first acoustic stimulus in the fluid in the conduit which is reflected from an end of the conduit to provide a second acoustic stimulus travelling in the opposite direction.

DESCRIPTION OF THE DRAWINGS

The invention will now be described by way of example only with respect to the following drawings; of which.

DESCRIPTION OF THE INVENTION

Typically oil and gas wells are formed by drilling a bore hole and then forcing sections of metallic production casing down the bore hole. The various sections of the production casing are joined together as they are inserted to provide a continuous outer casing. After the production casing has been inserted to the depth required the void between the borehole and the casing is backfilled with cement, at least to a certain depth, to prevent any flow other than through the well itself. Perforation charges are then inserted to a desired section of the well and used to perforate the casing, the cement backfill and the surrounding rock. In some wells there may be a hydraulic fracturing process to fracture the rock to provide a flow path for the oil or gas. The well may be perforated at a number of different locations to provide multiple inlet points for the oil and gas.

Once all the perforation and fracturing steps have been completed sand screens/filters etc may be inserted at the inlet points and production tubing inserted in the middle of the casing to carry the oil and gas to the surface.

In use there may be a desire to monitor the flow from various different parts of the well. For instance the relative flow from different parts of the well may be of interest. It may help plan future wells to know that most flow is coming from a particular depth of the well for instance. Further monitoring the flow from various sections of well may allow a drop in flow from one particular inlet point to be detected which may be indicative that a screen or filter has become blocked.

Figure 1:
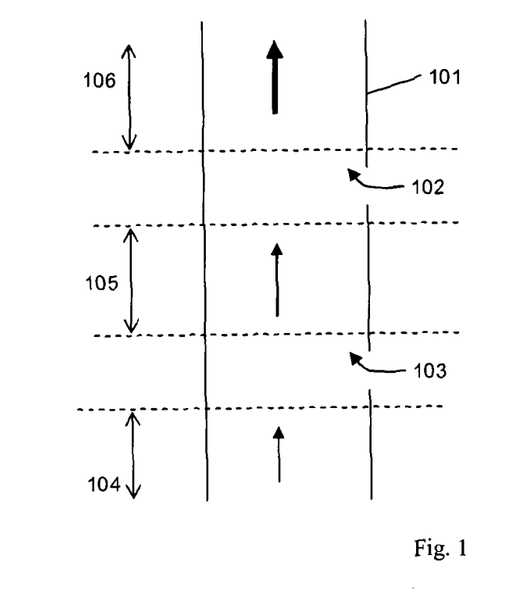
FIG. 1 illustrates flow from different sections of a well bore

FIG. 1 illustrates a section of a production tubing of a well and a first inlet 102 and a second inlet 103. In section 104 of the production tubing there may be a first flow rate of oil or gas from inlets below the second inlet 103. The additional inflow from inlet 103 results in an increased flow rate in the second 105 between the first and second inlets. The further inflow from inlet 102 increases the flow rate in section 106 still further.

Conventionally the rate of flow at the top of the well may be monitored by using a suitable flow meter. However clearly by measuring flow at the top of the well it is only possible to determine the total flow from the well. Thus it is not possible to determine whether most of the flow is coming from the first inlet 102, the second inlet 103 or inlets at different positions in the well. As mentioned this may be of interest for future planning. Additionally in some well the different production zones may be owned or leased by different organisations. Thus product obtained from inlet 103 may be credited to company A whereas product obtained from inlet 102 may be credited to company B. Thus there may be a need to determine the relative flow from these different inlets so that correct proportional of the total flow can be credited to each organisation.

Further although a reduction in flow may be detected by monitoring the flow at the top of the well it is not possible to determine whether the reduction occurred in one or more particular zones and may be indicative of a blocked inlet.

Due to the practical difficulties in providing suitable permanent flow sensors in production tubing it is conventional, when measurements of flow from various sections of a well are required, to halt production, insert a specialised wire line tool down the production casing and then allow some flow and take measurements from different depths within the well. This is a relatively costly and complex procedure which involves halting normal production.

Embodiments of the present invention therefore apply fibre optical distributed sensing to determining flow rates at different locations within a well. It should be noted that the techniques are particularly applicable to monitoring flow in wells because of the practical problems associated with other types of flow measurement in wells but the techniques are generally applicable to any applications where it is necessary to measure flow through conduits.

Figure 2:
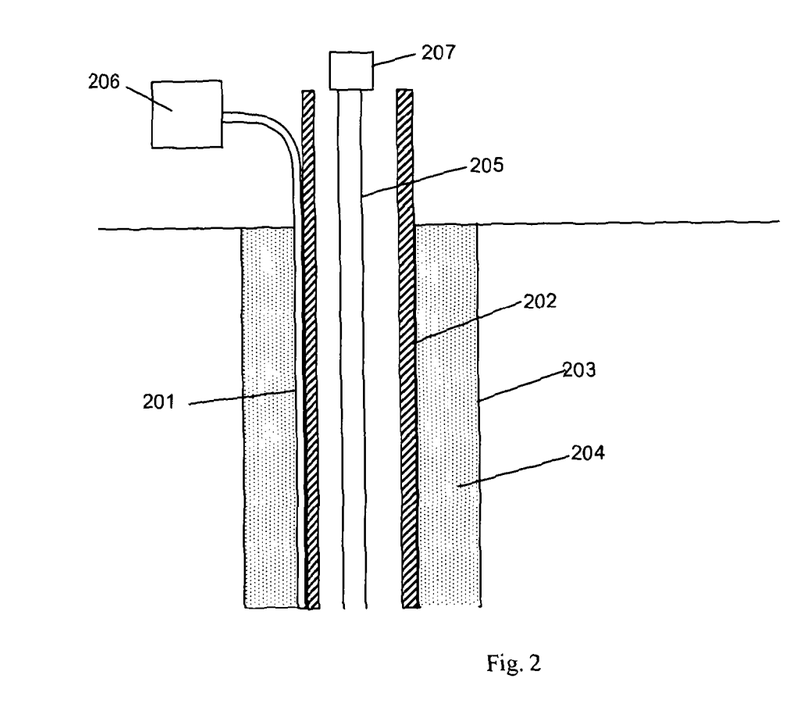
FIG. 2 shows a fibre optic distributed acoustic sensor deployed down a well.

FIG. 2 therefore illustrates a production well having a fibre optic distributed acoustic sensor deployed to detect acoustic signals within the well. A fibre optic cable 201, which may comprise standard single mode optical fibre such as routinely used in telecommunications protected in a rugged cable, is included along the path of a well. The fibre optical cable 201 is clamped to the outside of the production casing 202 within bore hole 203. As mentioned above. Typically the space between the outer wall of the casing 202 and the borehole 203 is filled with cement 204 to at least a certain depth. Other deployments of the optical fibre are possible however, for instance the fibre may be later inserted to the interior of the production casing 202 or it may be attached to the production tubing 205 which carries the oil or gas. The optical fibre may be deployed along the entire length of the production casing and thus may be several kilometers in length.

The fibre protrudes from the well head and is connected to interrogator/processor unit 206. The output from interrogator 206 is passed to a signal processor (not shown), which may be co-located with the interrogator or may be remote therefrom, and optionally a user interface/graphical display, which in practice may be realised by an appropriately specified PC. The user interface may be co-located with the signal processor or may be remote therefrom.

In operation the interrogator 206 launches interrogating electromagnetic radiation, which may for example comprise a series of optical pulses having a selected frequency pattern, into the sensing fibre. The optical pulses may have a frequency pattern as described in GB patent publication GB2, 442,745 (AT&T) the contents of which are hereby incorporated by reference thereto. As described in GB2,442,745 the phenomenon of Rayleigh backscattering results in some fraction of the light input into the fibre being reflected back to the interrogator, where it is detected to provide an output signal which is representative of acoustic disturbances in the vicinity of the fibre. The interrogator 206 may therefore comprises at least one laser and at least one optical modulator for producing a plurality of optical pulse separated by a known optical frequency difference. The interrogator also comprises at least one photodetector arranged to detect radiation which is backscattered from the intrinsic scattering sites within the fibre.

The signal from the photodetector is processed by signal processor. The signal processor conveniently demodulates the returned signal based on the frequency difference between the optical pulses such as described in GB2,442,745. The signal processor may also apply a phase unwrap algorithm as described in GB2,442,745.

The form of the optical input and the method of detection allow a single continuous fibre to be spatially resolved into discrete longitudinal sensing portions. That is, the acoustic signal sensed at one sensing portion can be provided substantially independently of the sensed signal at an adjacent portion. The size and position of the individual sensing portions along the length optical fibre may be determined by the properties of the interrogating radiation and the processing of the detected backscatter radiation. In an application to downwell monitoring the individual sensing portions may each be of the order of 10 m in length or less, say 5 m in length. In some applications the individual sensing portions may be of the order of 1 m in length. Conveniently the returns are processed so as to provide a separate acoustic channel from contiguous sensing portions of fibre along a length of the well bore of interest (which may be the entire well bore).

An acoustic transducer 207 is located at the well head to transmit an acoustic stimulus into the fluid within the well to allow the flow speed at various sections of the production tubing to be determined. The acoustic transducer should be capable of producing a relatively intense stimulus into the oil or gas within the production tubing such that the acoustic response to the stimulus may be discriminated from the noise of the normal flow, which may, for example involve correlation of the acoustic returns with the frequency of the stimulus. The transducer should be safe for use with oil or gas and should not constitute an ignition risk. A pneumatic or hydraulic transducer would be suitable.

In one flow monitoring technique the transducer 207 is configured to transmit an acoustic pulse into the fluid within the production tubing 205. The distributed acoustic sensor may then be configured to determine the time of flight between two channels of the sensor for both the pulse transmitted down the well, and thus against the direction of flow and the pulse reflected from the bottom of the well and thus travelling with the direction of flow. The acoustic response from various channels may be cross correlated to aid in identifying the pulses.

Figure 3:
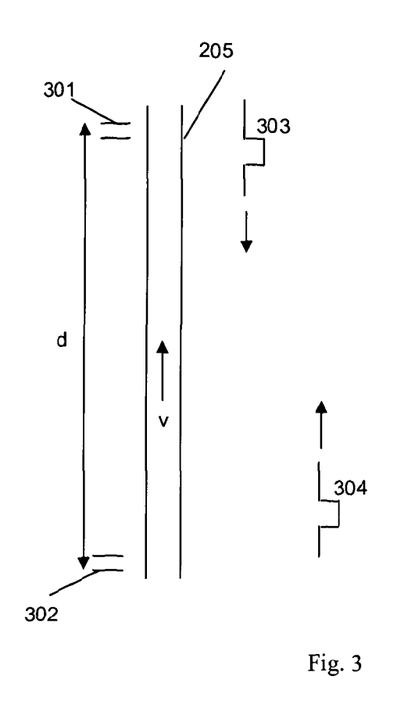
FIG. 3 illustrates an embodiment of the invention.

FIG. 3 shows a section of production tubing 205 with an upwards flow of fluid at a velocity v. The time of flight of the input pulse 303 between a first channel of the sensor 301 and the second channel of the sensor 302 is determined, as is the time of flight between for the reflected pulse 304 between the second channel 302 and the first channel 301. The time of arrival of the pulse 303 at the channels 301 and 302 and the time of arrival of the reflected pulse 304 at the channel may be determined by looking for the same signal characteristic in each channel and may involve performing a cross correlation between the channels.

For the pulse transmitted down the well, as the pulse is moving against the flow the time of flight between the sensing portions of the fibre is equal to $$t_1 = d/(c-v) \qquad \text{eqn. (1)}$$

where d is the distance between the channels, c is the speed of sound in the fluid and v is the flow speed.

For the pulse reflected from the bottom of the well and travelling back up the well the time of flight is equal to $$t_2 = d/(c+v) \qquad \text{eqn. (2)}$$

Rewriting as $$c-v = d/t_1 \qquad \text{eqn. (3)}$$

and $$c+v = d/t_2 \qquad \text{eqn. (4)}$$

and subtracting equations 3 and 4 it can be seen that $$v = d/2 * (1/t_2 - 1/t_1) \qquad \text{eqn. (5)}$$

Thus by measuring $t_1$ and $t_2$ the flow speed v between the first and second sensing portion of optical fibre can be measured. It is also possible to calculate the speed of sound at this section of fibre by $$c = d/2 * (1/t_2 + 1/t_1) \qquad \text{eqn. (6).}$$

To improve accuracy of the flow measurement the distance d should be as large as possible and the error in the timings $t_1$ and $t_2$ to be as small as possible. To minimise the timing error the acoustic frequency range in the transmitted pulse and sampling rate of the system should be as high as possible. If the timing accuracy is to within 0.1 ms then if d=100 m and c is of the order of 500 ms$^{-1}$ (the speed of sound in methane at 393K) then the speed will be accurate to 0.125 ms$^{-1}$.

In an embodiment of the present invention the acoustic transducer excites a continuous wave stimulus so as to generate a standing wave in the production tubing.

With no fluid flow a standing wave within the well can be understood as the sum of the downward travelling wave and the upward reflected wave. The phase change at the bottom of the well is fixed, and is dependent on the acoustic impedance difference between the fluid and the rock at the well bottom. When fluid starts to flow the relative wavelengths of the upwards travelling wave and downward travelling wave change.

This gives rise to a beat effect where the wave peaks will coincide less frequently than when there is no flow.

The wavelength of the wave travelling into the well, against the flow is $\lambda_1$ and if will be $$\lambda_1 = (c-v)/f \qquad \text{eqn. (7)}$$

where f is the frequency of the stimulus.

The wavelength of the wave reflected back from the bottom of the well $$\lambda_2 = (c+v)/f \qquad \text{eqn. (8)}$$

This situation is thus analogous to a beat frequency where the beat distance D is $$D = \lambda_1 \lambda_2 / (\lambda_1 - \lambda_2) \qquad \text{eqn. (9)}$$

Thus the beat distance D is equal to $$D = (c^2 - v^2)/2vf \qquad \text{eqn. (10)}$$

By determining the distance D between the nodes (or antinodes) of the standing wave the flow speed can thus be determined by $$v = (c^2 - v^2)/2fD \qquad \text{eqn. (11)}$$

As v is typically much lower than c this approximates to $$v = c^2/2fD \qquad \text{eqn. (12)}$$

If D is of a suitable length then its measurement can be used to determine flow velocity. The restrictions are that D must be greater than 2 channels to allow the peaks to be resolved, and it must also be smaller than the required resolution of flow velocity down well, say 100 m.

If f is set to be 10 kHz say, and D is 100 m say this gives a minimum detectable velocity of around $0.125 \text{ ms}^{-1}$ for $c = 500 \text{ ms}^{-1}$, however, this velocity will be measurable with a high degree of sensitivity. If the position of the nodes can be determined within a 1 channel error, this will give a velocity uncertainty of about $0.005 \text{ ms}^{-1}$.

A lower velocity could be measured, but only at the expense of spatial resolution, for a stimulus wavelength of around 10 kHz. However it is noted that as the method involves the detection of the beat effect then a stimulus having a higher frequency may be used. For instance if the acoustic stimulus has an ultrasonic frequency, e.g. 20 kHz or greater, say 50 kHz for example, then the velocity and/or spatial resolution that can be obtained will be much better. It is noted that some distributed acoustic sensor may not be able to directly determine such relatively high frequencies as the interrogation rate of the fibre by the optical pulses may be itself of the order of a few tens of kHz. However whilst the ultrasonic frequency may not be directly detectable the resultant beat frequency may be within the detectable frequency range of the DAS sensor. As the flow detection method relies on detecting the beat effects the use of ultrasonic stimulus frequencies thus provides improved spatial and/or velocity resolution.

It will be noted that the embodiments described above rely on knowledge of the distance between sensing channels in terms of spacing along the well. This may be known from some previous calibration step where an event that generates acoustic signals at a known depth within the well is used to located particular sensing portions of the optical fibre with known sections of the well.

Alternatively the techniques described above may be used to derive a flow value at the same time that an actual flow sensor is present within the well. The value determined by the method described above may therefore be compared with that derived by a flow sensor inserted into the well and any discrepancies used to calibrate the position of the acoustic channels of the DAS sensor within the well.

In one embodiment however knowledge of the speed of sound within the various sections of the production tubing may be used to calibrate the position of the sensing portions of fibre within the well.

For example if a lower frequency standing wave is set up in the well with a wavelength of about 10 channels, then this could be used to calibrate the position of the fibre in the well as long as the speed of sound in the well is known. A 10 channel node separation would require an excitation frequency of around 10 Hz.

The speed of sound may be estimated by knowledge of the composition of the fluid within the production tubing and knowledge of the temperature of the fluid. Oil and gas wells typically comprise temperature sensors such as fibre optic distributed acoustic temperature sensors and hence the temperature gradient within the well may be known and used to determine the speed of sound with various sections of the well.

The invention claimed is:

1. A method of determining flow speed of a fluid within a conduit comprising the steps of:
    introducing at least one acoustic stimulus into the fluid in the conduit such that a first acoustic stimulus travels in one direction in the conduit and a second acoustic stimulus travels in the opposite direction in the conduit so as to set up standing waves within the fluid;
    interrogating an optical fibre deployed along the length of the conduit to provide a fibre optic distributed acoustic sensor;
    monitoring the acoustic response to the first acoustic stimulus and second acoustic stimulus using said distributed acoustic sensor; and
    using said acoustic response to determine the flow speed of the fluid.

2. A method as claimed in claim 1 wherein the conduit is the production tubing of an oil or gas well.

3. A method as claimed in claim 1 comprising introducing the acoustic stimulus such that the stimulus travels down the conduit to provide the first acoustic stimulus and reflects from the end of the conduit and travels back along the conduit to provide the second acoustic stimulus.

4. A method as claimed in claim 1 wherein the first acoustic stimulus is a propagating wave in the first direction and the second acoustic stimulus is a propagating wave in the second direction.

5. A method as claimed in claim 1 comprising detecting sensing portions of the optical fibre which correspond to beat nodes and/or antinodes of a standing wave.

6. A method as claimed in claim 5 comprising determining the distance along the conduit between said sensing portions of optical fibre corresponding to beat nodes and/or antinodes and using said distance to determine the flow speed at that section of conduit.

7. A method as claimed in claim 1 wherein the frequency of the stimulus waves is such that, for the flow speeds expected, the distance between beat nodes/antinodes is at least twice the length of an individual sensing portion of the optical fibre.

8. A method as claimed in claim 1 wherein said first acoustic stimulus and said second acoustic stimulus have a frequency in the ultrasonic range.

9. A method as claimed in claim 1 comprising determining the speed of sound in the fluid in a given section of conduit.

10. A method as claimed in claim 1 further comprising an initial step of determining the locations of the conduit that correspond to various sensing portions of the distributed acoustic fibre by calibrating acoustic events at known locations in the conduit with the sensing portions of the distributed acoustic sensor which detect such acoustic events.

11. A method as claimed in claim 1 wherein the acoustic response to the first and second stimuli is used, with knowledge of the speed of sound in the fluid of the conduit, to determine the distance between first and second sensing portions.

12. A method as claimed in claim 11 wherein the speed of sound in the fluid is estimated based on a knowledge of the composition of the fluid and the temperature of the fluid.

13. A method of calibrating a distributed acoustic sensor having an optical fibre deployed along the length of a fluid carrying conduit comprising:
    introducing at least one acoustic stimulus into the fluid in the conduit such that a first acoustic stimulus travels in one direction in the conduit and a second acoustic stimulus travels in the opposite direction in the conduit so as to set up a standing wave; and determining the sensing portions of the distributed acoustic sensor which correspond to the nodes and/or antinodes of the standing wave to calibrate said distributed acoustic sensor.

14. A method as claimed in claim 13 performed in the absence of any flow of the fluid.

15. A method as claimed in claim 13 wherein the conduit comprises part of an oil or gas well.

16. A method as claimed in claim 15 wherein the method is performed when the conduit is filled with a fluid of known composition which is not oil or gas.

17. A method as claimed in claim 1 wherein the step of interrogating the optical fibre to provide a distributed acoustic sensor comprises launching a series of optical pulses into said fibre and detecting radiation Rayleigh backscattered by the fibre;

and processing the detected Rayleigh backscattered radiation to provide a plurality of discrete longitudinal sensing portions of the fibre.

18. A method as claimed in claim 1 wherein the acoustic stimulus is generated using a pneumatic or hydraulic transducer.

19. A distributed acoustic sensing apparatus capable of determining flow speed of a fluid in a conduit comprising:

an optical source for generating radiation to be launched into an optical fibre;

a detector for detecting radiation backscattered from said optical fibre; and a processor for processing said detected radiation to provide a distributed acoustic sensor; wherein said processor is configured to process the acoustic signals to detect the acoustic response to a first acoustic stimulus travelling in one direction in the conduit and a second acoustic stimulus travelling in the other in the conduit and configures to identify sensing portions of the optical fibre which correspond to beat nodes and/or antinodes of a standing wave and determine a flow speed in said conduit based on said identified sensing portions corresponding to beat nodes and/or antinodes.

20. A flow speed measuring apparatus comprising a distributed acoustic sensor as claimed in claim 19 and an acoustic transducer for generating a first acoustic stimulus in the fluid in a conduit, and a second acoustic stimulus traveling in the opposite direction in the conduit so as to set up standing waves within the fluid.

21. A flow speed measuring apparatus as claimed in claim 20 wherein the acoustic transducer is arranged to generate a first acoustic stimulus in the fluid in the conduit which is reflected from an end of the conduit to provide a second acoustic stimulus travelling in the opposite direction.

* * * * *